US010992874B2

(12) United States Patent
Chien et al.

(10) Patent No.: US 10,992,874 B2
(45) Date of Patent: Apr. 27, 2021

(54) CAMERA SYSTEM AND CAMERA FILL LIGHT METHOD

(71) Applicant: LATTICE ENERGY TECHNOLOGY CORPORATION, New Taipei (TW)

(72) Inventors: Ta-Yi Chien, Taichung (TW); Ying-Ju Lai, Taichung (TW); Yung-Chou Chen, Taipei (TW); Wei-Hung Liao, New Taipei (TW); Fen-Ling Hu, Huatan Township (TW)

(73) Assignee: LATTICE ENERGY TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 16/546,411

(22) Filed: Aug. 21, 2019

(65) Prior Publication Data
US 2020/0068113 A1 Feb. 27, 2020

Related U.S. Application Data

(60) Provisional application No. 62/722,986, filed on Aug. 27, 2018.

(51) Int. Cl.
*H04N 5/235* (2006.01)
*H04N 17/00* (2006.01)

(52) U.S. Cl.
CPC ......... *H04N 5/2354* (2013.01); *H04N 17/002* (2013.01)

(58) Field of Classification Search
CPC .................. H04N 5/2354; H04N 17/002
(Continued)

(56) References Cited

U.S. PATENT DOCUMENTS 5,384,611 A * 1/1995 Tsuji ................. G03B 7/16
396/180
5,692,223 A * 11/1997 Ichikawa ............ G03B 7/16
396/182
(Continued)

FOREIGN PATENT DOCUMENTS

JP 2014006304 A * 1/2014

OTHER PUBLICATIONS

Machine translation of JP2014006304A, Suzuki et al.,Imaging Device, Imaging System, and Illumination Method, Jan. 16, 2014. (Year: 2014).*

*Primary Examiner* — Michael Lee
(74) *Attorney, Agent, or Firm* — Chun-Ming Shih; HDLS IPR Services

(57) ABSTRACT

The present application related to a camera system and a camera fill light method. The camera system establishes a wireless communications connection with a fill light, captures an original image by a camera in the camera system, and then transmits a first test light signal to the fill light such that a first flash is performed by the fill light. The camera captures a first light source image during the first flash period of the fill light. A fill light controller in the camera system compares differences of the brightness or the chroma of different image information and, after determining the present location of the fill light, calculates a dislocation result of the present location of the fill light and the best placement location of the fill light. The camera system yields the dislocation result to the photographer via a notification message.

11 Claims, 7 Drawing Sheets

(58) Field of Classification Search
USPC .......................................................... 348/175
See application file for complete search history.

(56) References Cited

U.S. PATENT DOCUMENTS

| | | | |
|---|---|---|---|
| 2002/0127019 A1* | 9/2002 | Ogasawara | G03B 1/00 |
| | | | 396/661 |
| 2014/0347554 A1* | 11/2014 | Shirakawa | G03B 15/05 |
| | | | 348/370 |
| 2015/0312553 A1* | 10/2015 | Ng | H04N 5/23203 |
| | | | 348/47 |
| 2017/0367785 A1* | 12/2017 | Munari | H05B 45/20 |
| 2018/0332208 A1* | 11/2018 | Tamura | G03B 7/17 |

* cited by examiner

CAMERA SYSTEM AND CAMERA FILL LIGHT METHOD

CROSS-REFERENCES TO RELATED APPLICATION

The present application claims priority under 35 U.S.C. § 119(a) to U.S. provisional Patent Application No. 62/722,986, filed on Aug. 27, 2018, in the US Intellectual Property Office, which is incorporated herein by reference in its entirety.

BACKGROUND OF THE INVENTION

1. Field of the Invention

The present disclosure relates to a camera system, and in particular to a camera system and a camera fill light method for calculating a best placement position of a fill light through a test and providing a prompt message to the photographer.

2. Description of the Related Art

In recent years, optical digital cameras have become popular along with cloud technology. Many photographers like to upload their photos to the Internet for sharing. The images may be affected by the brightness of the environment at the time it were taken, resulting that main features of the images (such as portraits, dishes, or artworks) were too dark and unappealing overall.

In order to solve the above issue of insufficient illumination, the images can be improved by adjusting their brightness and chroma using an image editing software in a computer. However, the entry level of this method is relative high, and the modified images will not felt authentic, for example the inconsistency in chroma and brightness of the adjacent areas in the image, or the inconsistency of the reflections (such as reflected light in the eyes).

Another fix is using a fill light to directly fill the brightness while shooting. However, the distance and angle between the fill light and the subject are all influential to the effect of the fill light. For example, when the fill light is put too far, it may not be obvious enough or it will cause the whole image to be too bright (i.e., the subject in the image is too white). When the fill light is put too close, it will cause only certain areas to be too bright, such that the discrepancy in brightness renders the overall image inconsistent. It is therefore the placement of the fill light has direct impact on the result of shooting. Although, the placement of the fill light is usually determined according to the photographer's experience. An amateur photographer is usually incapable of finding the best placement and/or suitable parameters for the present shooting quickly, and this can only be gradually improved through repeated attempts and accumulated experience.

Therefore, how to solve the above problems is the main focus of the art that the present invention engaged in for improvement.

BRIEF SUMMARY OF THE INVENTION

An objective of the present disclosure is to provide a camera system and a camera fill light method for calculating a dislocation result between a present location and a best placement position of a fill light through a test.

Another object of the present disclosure is to provide a camera system and a camera system and a camera fill light method for providing suggestions of best placement positions of a fill light according to the dislocation result.

To achieve at least the above objective, the present disclosure provides a camera system and a camera fill light method. The camera system establishes a wireless communications connection with a fill light, captures an original image by a camera in the camera system, and then transmits a first test light signal to the fill light such that a first flash is performed by the fill light. The camera captures a first light source image during the first flash period of the fill light. A fill light controller in the camera system compares differences of the brightness or the chroma of different image information and, after determining the present location of the fill light, calculates a dislocation result of the present location of the fill light and the best placement location of the fill light. The camera system provides the dislocation result to the photographer via a notification message.

In addition, the present disclosure provides a camera fill light method, comprises following steps: establishing a wireless communications connection between a camera system and a fill light; capturing a original image information using a camera of the camera system; sending a first test light signal to the fill light to make the fill light test a first flashing, and capturing a first light source image information during the first flashing test using the camera; comparing difference between brightness or chroma of the original image information and the first light source image information using a fill light controller of the camera system; determining a present location of the fill light according to the difference of brightness or chroma of the same blocks of the different images using the fill light controller; and calculating a dislocation result between the present location and the best position of the fill light using the fill light controller.

Through the above system and the fill light method, the dislocation result of the difference between the current position of the fill light and the optimal placement of the fill light is calculated, and a prompt message is generated according to the dislocation result. The photographer can follow the suggestion to adjust the fill light placement and the setting of fill light parameters. The present disclosure can reduces the entry level of experience so as to allow amateur photographers to easily reach the level of professionals.

DETAILED DESCRIPTION OF THE INVENTION

To facilitate understanding of the object, characteristics and effects of this present disclosure, embodiments together with the attached drawings for the detailed description of the present disclosure are provided.

Figure 1:
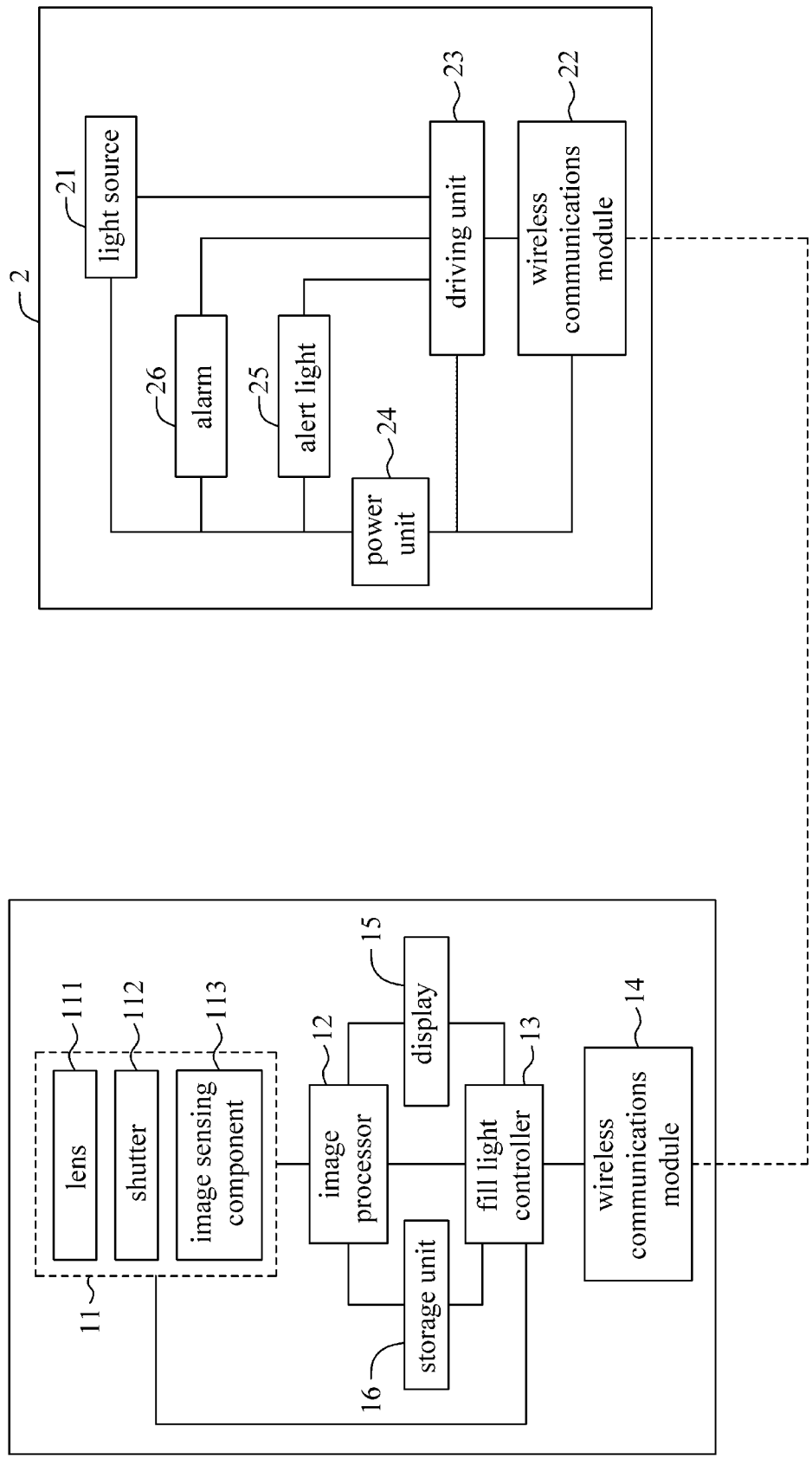
FIG. 1 is a Block diagram of the camera system and the fill light of the present invention.

Please refer to FIG. 1, which is a block diagram of a camera system and a fill light according to the present invention. The present invention is mainly divided into two areas, a camera system 1 and a fill light 2, and the fill light 2 is an off-camera flash. The fill light 2 and the camera system 1 are separated from each other. The camera system 1 communicates with the fill light 2 through wireless communications connection. The camera system 1 and the fill light 2 perform a test shot first, and a result of dislocation is obtained through test shooting, and then perform an actual shooting to obtain an actual image information.

The camera system 1 includes a camera 11, an image processor 12, a fill light controller 13, a wireless communications module 14, a display 15, and a storage unit 16. The camera 11, the image processor 12 and the fill light controller 13 are electrically connected. The image processor 12, storage unit 16, the fill light controller 13 and the display 15 are electrically connected. The fill light controller 13 and the storage unit 16, the display 15 and the wireless communications module 14 are electrically connected.

The camera 11 includes a lens 111, a shutter 112 and an image sensing component 113. The shutter 112 controls the exposure time of the image sensing component 113. The camera 11 captures a picture within the perspective of the lens 111 to generate an original image information. The original image information is transmitted to the image processor 12.

After receiving the original image information, the image processor 12 performs an analysis and comparison according to a database stored in the storage unit 16 to generate an image theme result, where the image theme result is the theme context of the original image information. The theme context is one or a combination of indoor, outdoor, glare, low light, point light, strong background light, weak background light, portrait, party, and movement.

The fill light controller 13 controls the opening and closing time of the shutter 112, and simultaneously sends a test light signal to the fill light 2 via the wireless communications module 14, thereby controlling the fill light 2 to generate a test flash. The illumination time, intensity, color temperature and spectrum of the test flash may vary according to the parameters of the test light signal, and the opening and closing of the shutter 112 is synchronized with the test flash generated by the fill light 2 to avoid the occurrence of a red eye problem. The fill light controller 13 refers to the image theme result, and determines a dislocation result between the current location and the optimal placement of the fill light 2 according to the difference of the image information captured before and after the light source 21 of the fill light 2 is illuminated. A prompt message is generated according to the dislocation result and displayed on the display 15 for the photographer to refer to.

The wireless communications module 14 establishes a wireless communications connection with a wireless communications module 22 of the fill light 2, so that the information of the camera system 1 and the fill light 2 can communicate with each other. The wireless communications connection is, for example but not limited to, Bluetooth, WiFi or TCP/IP, and other wireless communications technologies with the same functions or developed in the future can also be applied.

The display 15 is, for example, but not limited to, a liquid crystal display, and the display 15 is configured to display the actual image information and the prompt message after the actual shooting, and the prompt message is an optimal placement suggestion of the fill light 2. The prompt message is displayed on the display 15 as an arrow, a line, a highlighted block, a dynamic icon or a score, so that the photographer can adjust the position of the fill light 2 according to the indication of the prompt message.

The storage unit 16 is configured to store differences of image information generated in the same shooting angle but with the fill light 2 in different positions, and the difference of image information includes one of a brightness difference curve, a chroma difference curve, a color temperature difference curve, and a spectral difference curve, or in combinations of any of the above. The storage unit 16 stores the image information and the fill light controller 13 reads the difference of image information, so that the fill light controller 13 determines the dislocation result, and the dislocation result includes one of the distance dislocation information the direction dislocation information, and spectral dislocation information or any combinations of the above.

The fill light 2 includes a light source 21, a wireless communications module 22, a driving unit 23, a power unit 24, a alert light 25, and an alarm 26. The driving unit 23 and the light source 21, the wireless communications module 22, the alert light 25 and the alarm 26 are electrically connected, and the power unit 24 is electrically connected to each of the above components.

The light source 21 is, for example, but not limited to, a flash bulb or an electronic flash, and generates corresponding illumination variants according to the driving signals issued by the driving unit 23, such as variations on light-emitting time, light-emitting intensity, the number of light-emitting, light-emitting spectrum, and color temperature of light-emitting, and the like.

The wireless communications module 22 establishes a wireless communications connection with the wireless communications module 14 of the camera system 1, so that the information of the camera system 1 and the fill light 2 can communicate with each other via, for example, but not limited to Bluetooth, WiFi or TCP/IP and other wireless communications technologies with the same functions or developed in the future.

The driving unit 23 generates a driving signal corresponding to the test light signal to the light source 21 according to the test light signal sent by the fill light controller 13 to control the time, intensity, quantity, spectrum and color temperature of the flash, and also drives the alert light 25 and the alarm 26 to issue a corresponding alert light or alarm tone.

The power unit 24 provides the power required for the operations of the entire fill light 2. The power unit 24 is, for example but not limited to, a power storage unit, and may be a rechargeable battery or a disposable dry battery. The power unit 24 further has a power input terminal for external power to charge the power storage unit.

The alert light 25 is, for example but not limited to, a light-emitting diode. The alert light 25 generates a dislocation alert light according to the driving signal from the driving unit 23, and the dislocation alert light includes one of a flash light frequency difference, a flash color difference, and a flash position difference or any combination of the above.

The alarm 26 is, for example but not limited to, a speaker. The alarm 26 generates a dislocation alert sound according to the driving signal from the driving unit 23. The dislocation alert sound includes a sound frequency difference, a sound period difference, a volume difference, and a sound tone difference.

Figure 2A:
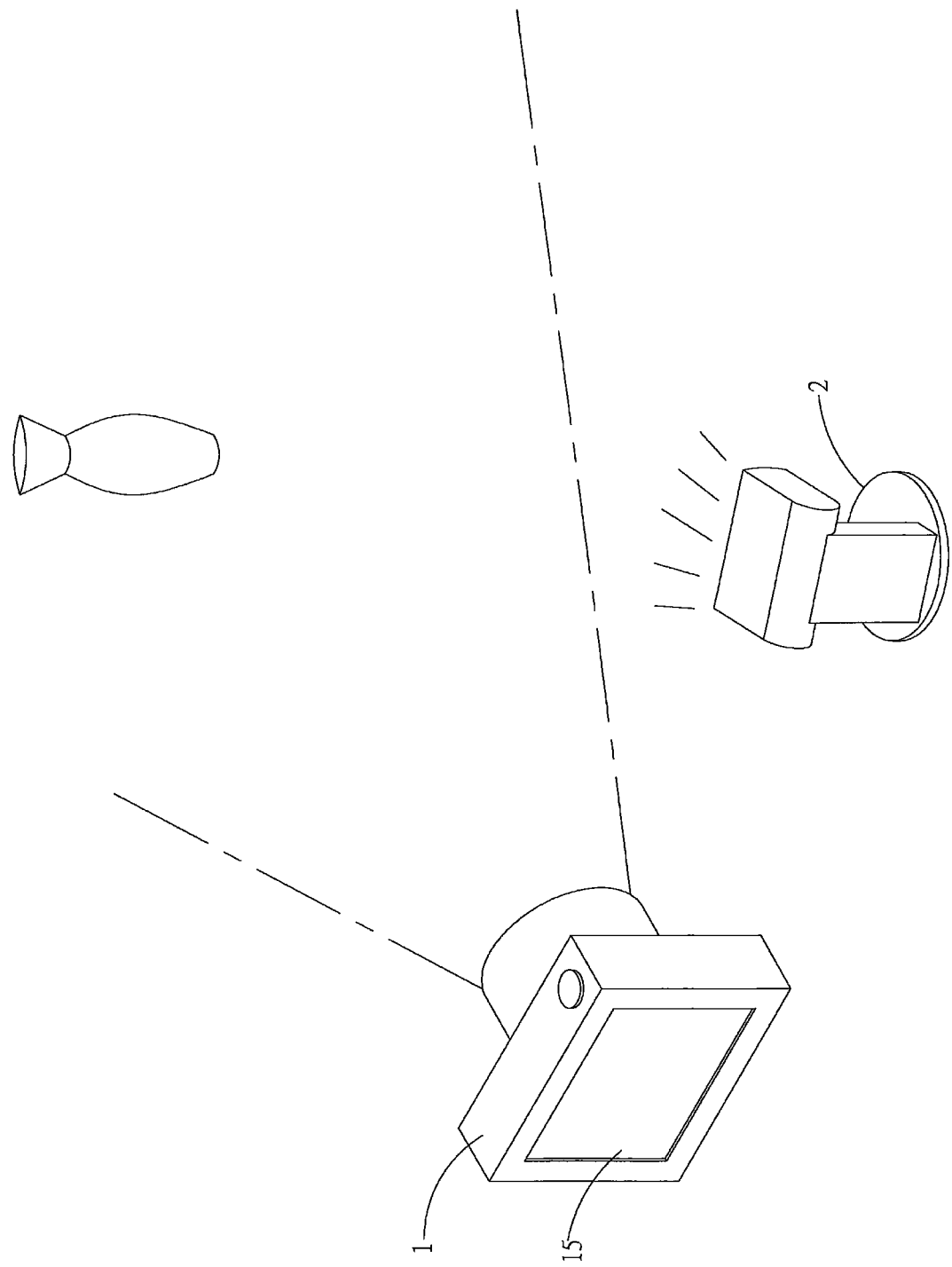
FIG. 2A is a schematic diagram of the use of the camera system and the fill light of the present invention.
Figure 2B:
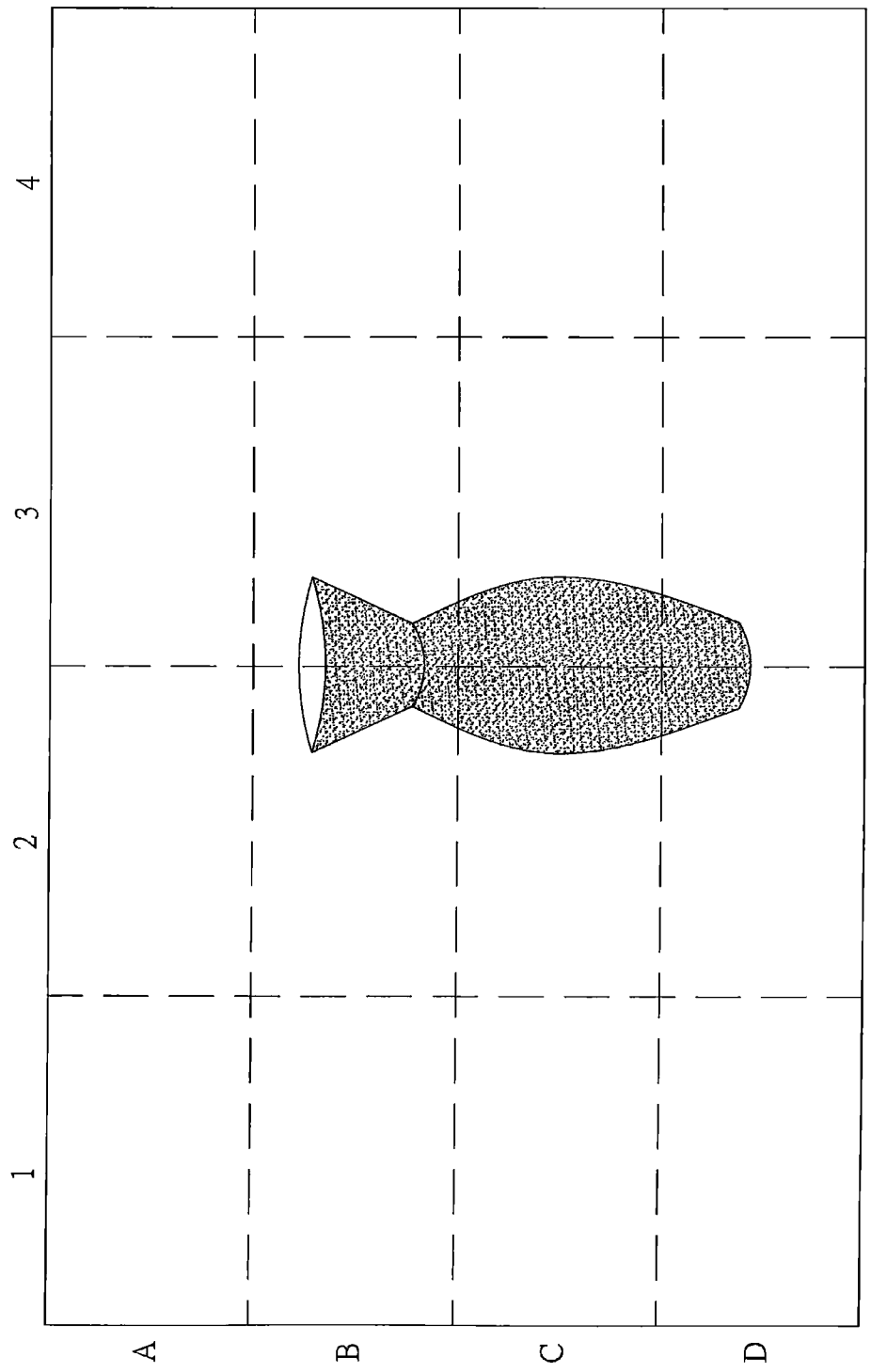
FIG. 2B is a schematic diagram of dividing the original image information into several regions.
Figure 2C:
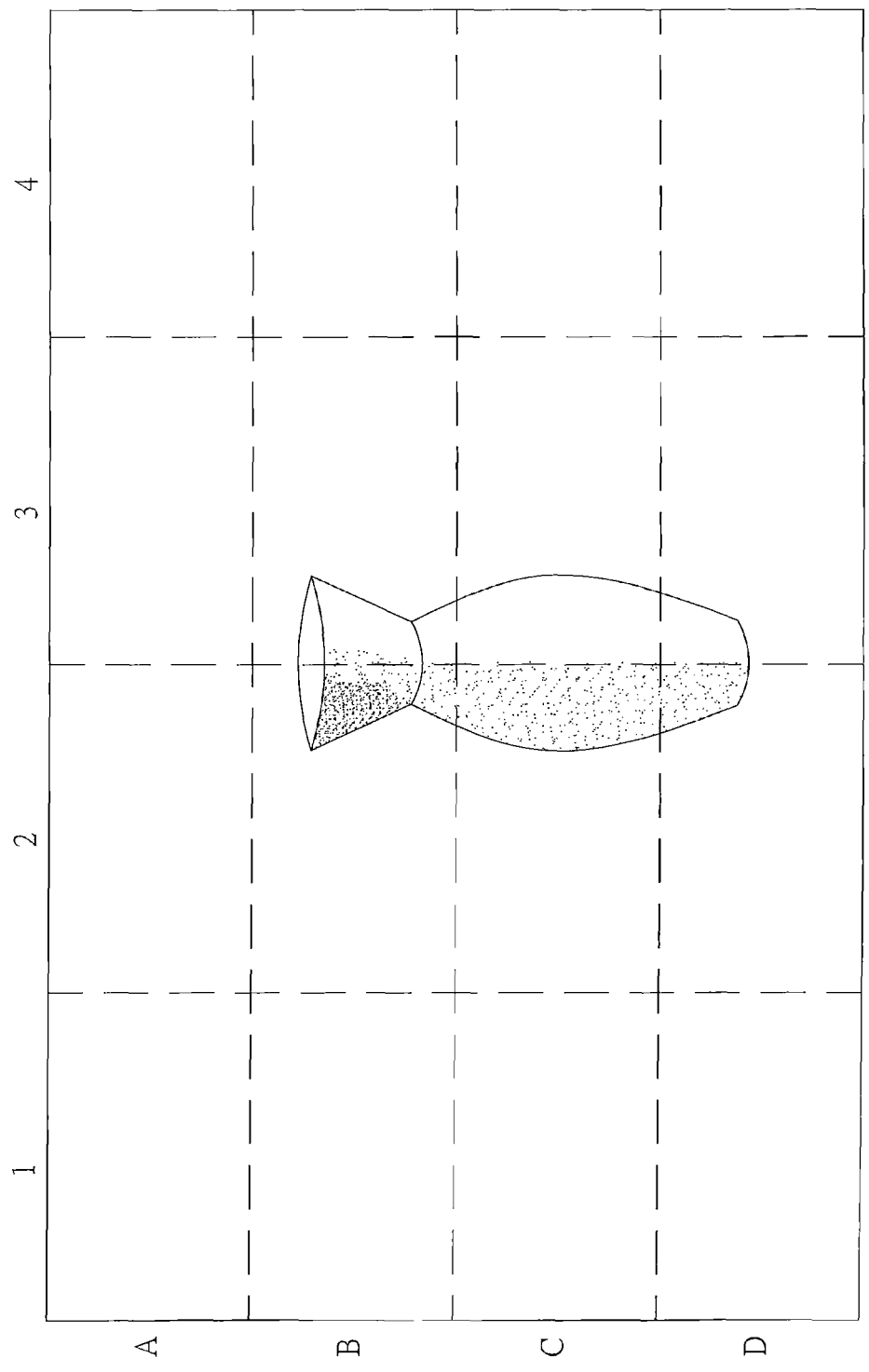
FIG. 2C is a schematic diagram of dividing the first light source image information into several regions.

Please refer to FIG. 2A, FIG. 2B and FIG. 2C, which are diagrams showing the use of the camera system 1 and the fill light 2 of the present invention, a schematic diagram of dividing the original image information into a plurality of regions, and a schematic diagram of dividing the first light source image information into several regions. Referring to FIG. 1, the camera system 1 and the fill light 2 establish a wireless communications connection through the wireless communications modules 14 and 22 when in use. In this embodiment, Bluetooth wireless communications is used as an example, and in first pairing, the security password is required to ensure that the fill light 2 is not paired with other electronic devices, and the subsequent pairing does not need to input the security password. When the pairing is completed, the camera system 1 captures an original image information through the camera 11, where the original image information is defined as image information without any fill light or test flash. The fill light controller 13 divides the original image information into a plurality of regions (for example, a 4*4 matrix, and each area is defined by, for example, a column order (1, 2, 3, 4) and a row order (A, B, C, D), the first column of the first row is defined as A1, the fourth column of the fourth row is defined as D4). And according to image factors (such as the number of faces, the number of objects, the length of the distance, the color of the partition, the sky detection, the green scene detection, etc.) in these areas, the original image information is analyzed and thereby generates the image theme result, and after looking up the database in the storage unit 16, the theme of the image information is acquired.

After the fill light controller 13 selects the test fill light parameters according to the theme situation from the database, the test fill light parameters are converted into a test light signal and the test light signal is sent to the fill light 2, such that the fill light 2 flashes for a short period of time. The test flashs cannot be sensed by the human eye, and the fill light controller 13 also controls the opening and closing time of the shutter 111, so that the camera 11 captures one of the first light source images during the test flash period of the fill light 2. The first light source image is the image taken during the first test flash, and the fill light controller 13 also divides the first light source image into several regions (for example, the matrix of 4 rows*4 columns described above). Then, the fill light controller 13 compares the difference (such as brightness, chroma, color temperature, spectrum, etc.) of each area. The fill light controller 13 refers to the database according to the difference of each area to know the current location of the fill light 2, and then comparing the preset location with the optimal position in the database to generates a result of the dislocation between the current location and the optimal placement of the fill light 2.

Please refer to FIGS. 2B and 2C, the difference of each region above will be detailed in an example. The fill light controller 13 compares the original image with the first light source image, and the brightness difference of the regions B3, C3, and D3 are relatively larger (for example, the brightness difference value is "+2") than other regions, the brightness difference of the areas C2 and D2 is relatively smaller (for example, the brightness difference value is "+1") than other regions, and the fill light controller 13 can determine that the fill light 2 is on the right side of the subject by referring to conditions such as a brightness of "+2" in the regions B3, C3, and D3 and brightness of "+1" in the regions C2 and D2 (variations) in the database. The more reference parameters (brightness, chroma, color temperature, spectrum), the more accurate this method would be.

In addition, the fill light controller 13 may perform comparison solely on the same area that has a difference in brightness, chroma, color temperature, spectrum, etc. Please refer to the 2B and 2C, in the regions B3, C3, D3, C2, and D2, the brightness varies. The fill light controller 13 can determine the fill light 2 is on the right side of the object according to that the areas B3, C3, D3, C2, and D2 have brightness variation but there is no brightness change in the area B2. In this way, the method to determine the location of the fill light 2 is relatively simple and no database is needed. This can be implemented as a built-in function of the fill light controller 13 without reference to the database.

Figure 3:
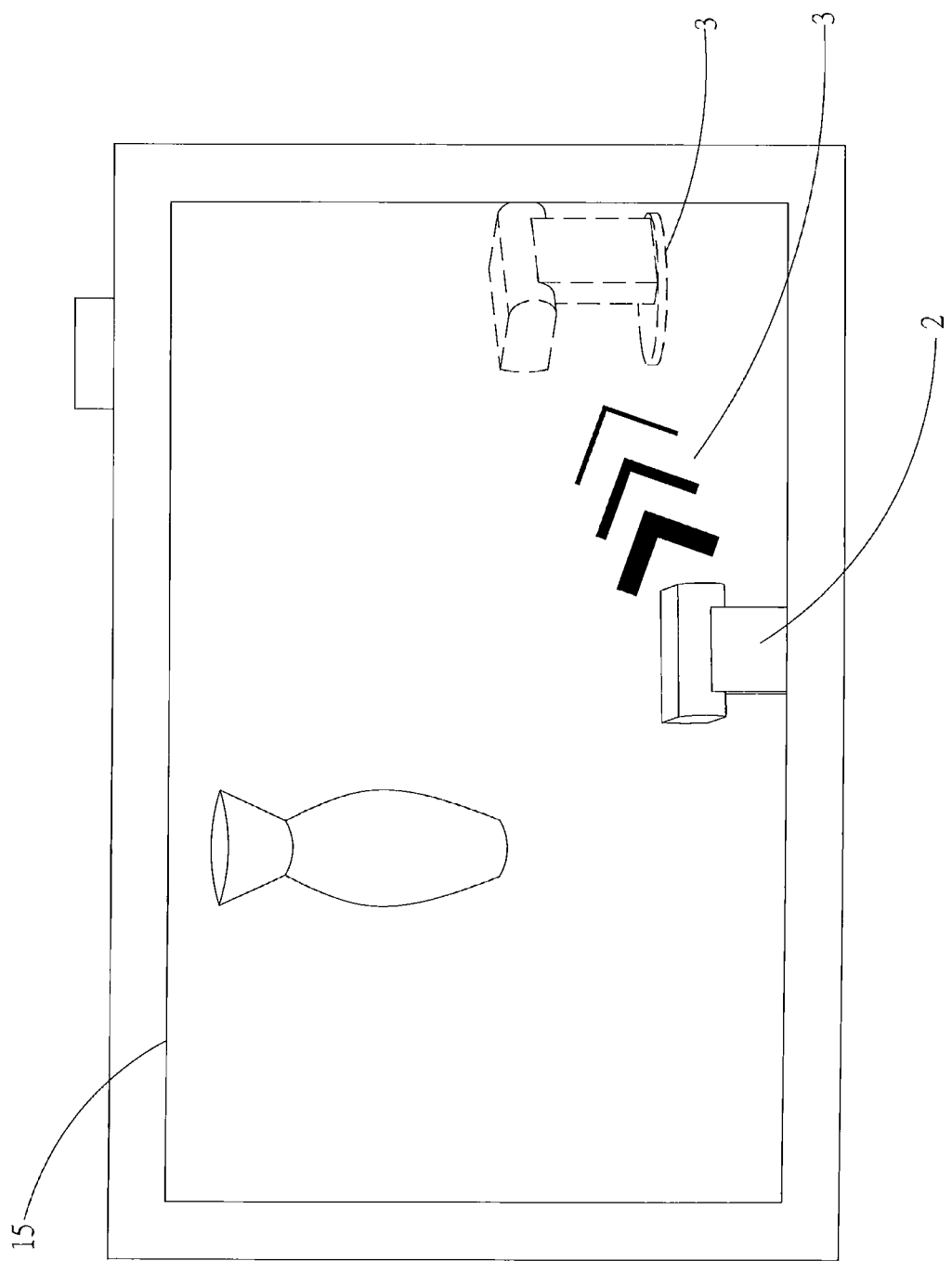
FIG. 3 is a schematic diagram of a prompt message displaying a dynamic icons on a display of the camera system of the present invention.

Please refer to FIG. 3, which is a schematic diagram of the prompt message of the dynamic icon on the display of the camera system of the present invention, along with FIG. 1 and FIG. 2A. After the camera system 1 completes the above test shooting and actual shooting, the display 15 displays the actual image information and the prompt message, and the prompt message is displayed on the display 15 according to the dislocation result by an arrow, a frame line, a block highlight image, a dynamic icon or a score. In this embodiment, the dynamic icon and the frame line are used for description. The dynamic icon can be provided for the photographer to watch the change of the semaphore in order, and the frame line can provide a schematics of the fill light to the photographer for viewing. The photographer can 1 move the fill light 2 to the best position according to the message.

When the fill light 2 is moved, the fill light 2 will prompt the photographer according to the difference between the current position and the optimal placement position, and continuously communicate with the fill light controller 13 of the camera system 1. For example, when the fill light 2 is far away from the optimal placement position, the flash of the dislocation alert light is slower, and the flashing speed gradually becomes faster as it approaches, and the light of the alert light falls when the optimal placement position is reached. The color changes and is constantly bright, and the change of the flash light allows the photographer to know the fill light 2 to reach the optimal placement position.

In the above case, the photographer can also be prompted by the falling alert sound. When the fill light 2 is far away from the optimal placement position, the period of the alarms of the dislocation alert sound is longer. When approaching, the period of the beeps is gradually shortened. When the optimal placement position is reached, the dislocation warning tone is changed to play music or a sound different from the tweet. The change of the sound allows the photographer to know the fill light 2 to reach the optimal placement position.

The above-mentioned dislocation alert light and dislocation alert sound can be used simultaneously or alternatively. For example, when the light is too bright, the alert light is not obvious, or when needed to maintain a quiet environment, the alert sound is not suitable. The alert light and sound can be used either at the same time or independently, so that the best placement position can be found quickly and conveniently.

In addition, the fill light controller 13 will continue to update the position of the fill light 2 for a period of time, and continuously updates the current position of the fill light 2 and the optimal placement. The dislocation result will be continuously acquired by comparison of images captured before and after the light source 21 of the fill light 2.

In addition, the fill light controller 13 displays an optional accessory message on the display 15 according to the image theme result and reference to the database. The selected accessory message suggests the photographer to mount some physical component that could alter the light source 21 on the fill light 2, such as a filter (monochrome filter, multi-color filter, styling filter, mesh filter, etc.) or a gauze. To mount the above-mentioned physical component on the fill light 2 and placed it on the light source 21 will change the fill light effect to serve more variety of purposes.

Figure 4:
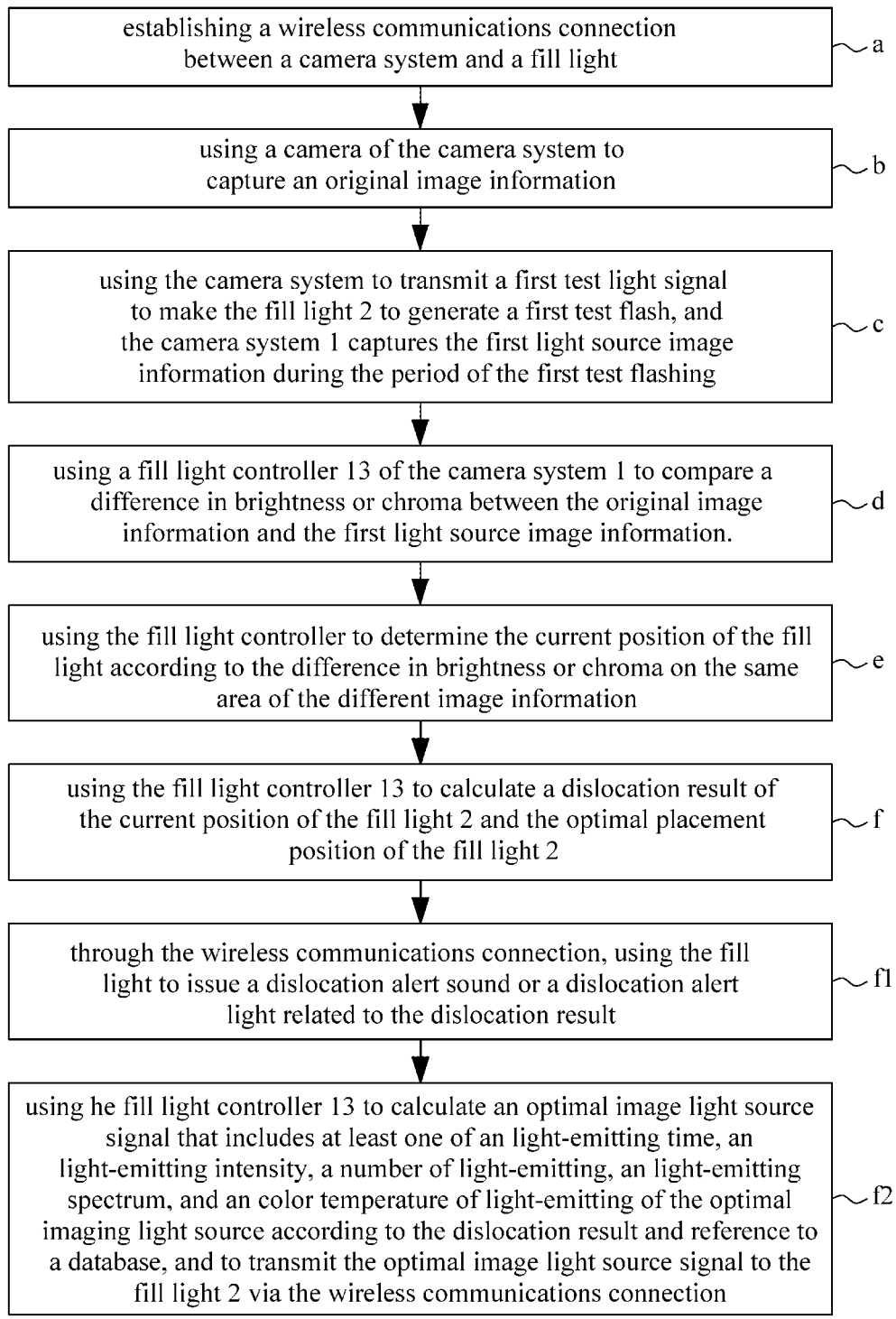
FIG. 4 is a flow chart of a first embodiment of the camera fill light method of the present invention.

Please refer to FIG. 4, which is a schematic flowchart of the first embodiment of camera fill light method of the present invention, and along with FIG. 1, FIG. 2A, FIG. 2B and FIG. 2C. The first embodiment of the camera light fill method of the present invention includes:

Step a: establishing a wireless communications connection between a camera system and a fill light; as described above, the camera system 1 and the fill light 2 establish a wireless communications connection through the wireless communications modules 14, 22, and the wireless communications connection can be, but not limited to, Bluetooth, WiFi or TCP/IP, and other wireless communications technologies with the same function or developed in the future can be also applied thereto.

Step b: using a camera of the camera system to capture an original image information; the camera 11 captures a picture within the perspective of the lens 111 to generate an original image information, and the original image information is image information without fill light 2 providing test flash.

Step c: using the camera system to transmit a first test light signal to make the fill light 2 to generate a first test flash, and the camera system 1 captures the first light source image information during the period of the first test flashing; and using the fill light controller 13 in the camera system 1 to transmit a first test light signal to the fill light 2, so that the fill light 2 generates a first test flash, and using the camera 11 to take the picture within the perspective of the lens 111 to generate a first source image information during the period of first test flash.

Step d: using a fill light controller 13 of the camera system 1 to compare a difference in brightness or chroma between the original image information and the first light source image information; and using the fill light controller 13 to divide both the original image information and the first light source image information into several areas and to compare the difference in brightness or chroma of the same area of the two image information. After the comparison, the difference between the two image information is obtained for each corresponding area.

Step e: using the fill light controller to determine the current position of the fill light according to the difference in brightness or chroma on the same area of the different image information; using the fill light controller 13 to determine the current position of the fill light 2 according to the difference between the two image information and. reference to a database in the storage unit 16.

Step f: using the fill light controller 13 to calculate a dislocation result of the current position of the fill light 2 and the optimal placement position of the fill light 2; using the fill light controller 13 to calculate the current position of the fill light 2 and the optimally placement of the fill light 2 to obtain a dislocation result. The dislocation result includes one of distance dislocation information, direction dislocation information, and spectral dislocation information or any combinations of the above.

Step f1: through the wireless communications connection, using the fill light to issue a dislocation alert sound or a dislocation alert light related to the dislocation result; using the fill light controller 13 to transmit the dislocation result to the fill light 2, and the driving unit 23 according to the dislocation result, to make the alert light 25 issue a dislocation alert light or make the alarm 26 issue a dislocation alert sound. When the position of the fill light 2 approaches or moves away from the optimal position, the alert light 25 and the alarm 26 may have corresponding changes, for example, changes in the frequency of the flashing light, changes in the color of the flashing light, changes in the position of the flashing light, and changes of the number of flashing light, changes in the frequency of the dislocation alert sound, changes in period of beeps, changes in the volume level, and changes in the tones of the sound, etc. The photographer is guided to move the fill light 2 to the optimal placement position by the above-mentioned sound and light changes.

Step f2: using the fill light controller 13 to calculate an optimal image light source signal that includes at least one of an light-emitting time, an light-emitting intensity, a number of light-emitting, an light-emitting spectrum, and an color temperature of light-emitting of the optimal imaging light source according to the dislocation result and reference to a database, and to transmit the optimal image light source signal to the fill light 2 via the wireless communications connection; after the fill light 2 is moved to the optimal placement position, the fill light controller 13 calculates the optimal image light source signal corresponding optimal position according to the dislocation result and reference to the database, and adjusts the light-emitting time, light-emitting intensity, number of light-emitting, light-emitting spectrum and color temperature of light-emitting of the fill light 2 to make the fill light emit the best light source.

The best placement of the fill light 2 mentioned above will vary depending on the subject, such as providing the best eye light or different facial shadows in a portrait shot to create a different fill position for the face, the best position for providing foreground or background fill light in the background with brighter background, or the best position for dark fill in scenes with too much difference between scenes and shots; depending on the photographer's needs. The optimal placement is selected, or the fill light controller 13 automatically defines the optimal placement based on the image theme result.

Figure 5:
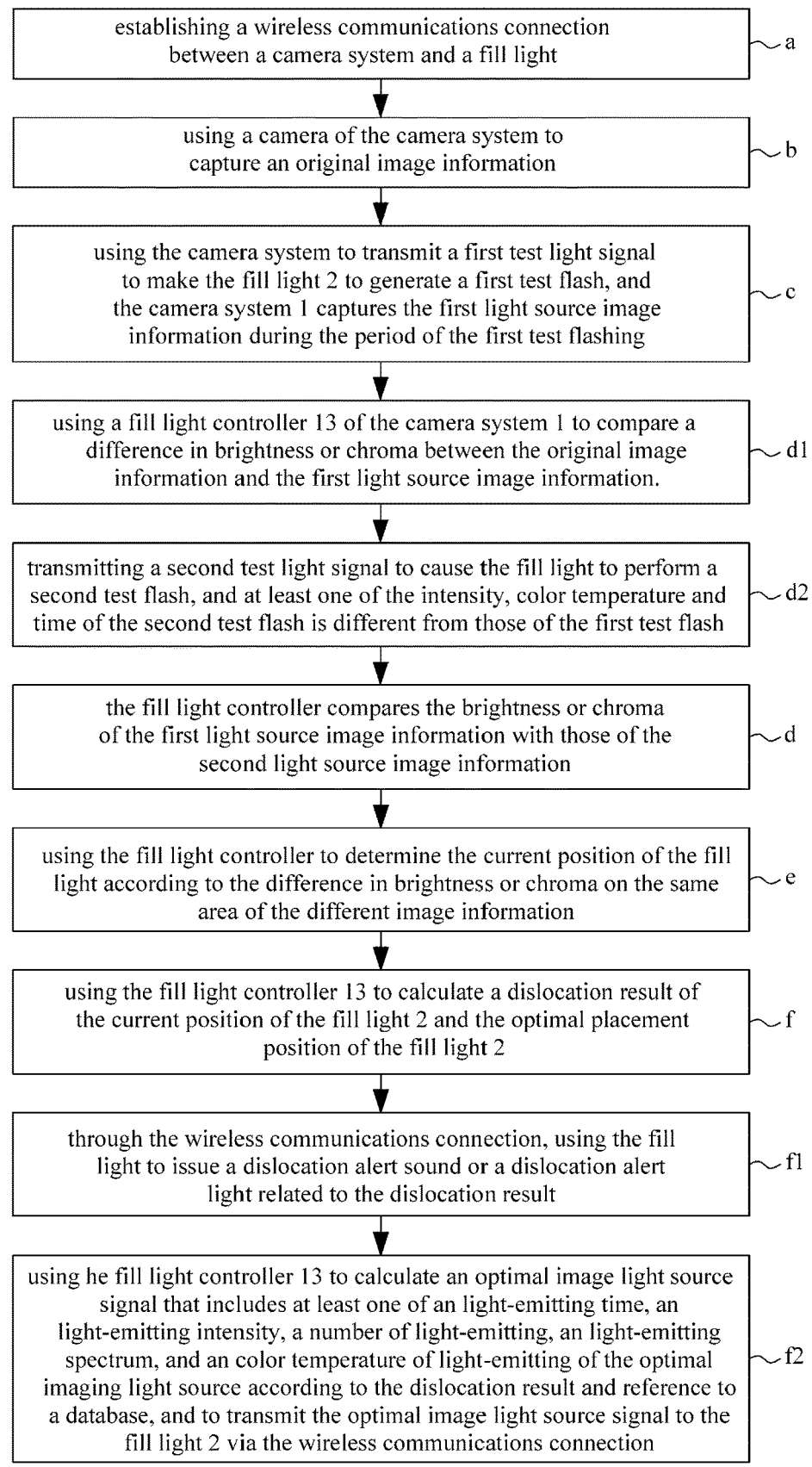
FIG. 5 is a flow chart of a second embodiment of the camera fill light method of the present invention.

Please refer to FIG. 5, which is a schematic flowchart of a second embodiment of the camera fill light method of the present invention, and along with FIG. 1, FIG. 2A, FIG. 2B, FIG. 2C and FIG. 4. The camera fill light method according to the second embodiment of the present invention includes:

Step a: a camera system establishes a wireless communications connection with a fill light; as described in the first embodiment of the camera fill light method, details are omitted for brevity.

Step b: one of the cameras in the camera system captures an original image information; as described in the first embodiment of the camera fill light method, details are omitted for brevity.

Step c: the camera system transmits a first test light signal to cause the fill light to perform the first test flash, and the camera system captures the first light source image information during the first test flash period; like the description of the first embodiment of the fill light method, details are omitted for brevity.

Step d: a fill light controller in the camera system compares the brightness or chroma of the original image information with those of the first light source image information; as described in the first embodiment of the fill light method, further description is omitted for brevity.

Step d1: transmitting a second test light signal to cause the fill light to perform a second test flash, and at least one of the intensity, color temperature and time of the second test flash is different from those of the first test flash. The camera captures a second light source image information during the second test flash period of the fill light; and the fill light controller 13 in the camera system 1 transmits a second test light signal to the fill light 2 to make the fill light 2 to generate a second test flash, and the second test flash is different from the first test flash in at least one aspect of intensity, color temperature and duration, and the camera 11 captures the picture within the perspective of the lens 111 to generate a second source image information during the second test flash.

Step d2: the fill light controller compares the brightness or chroma of the first light source image information with those of the second light source image information. The fill light controller 13 divides both the first light source image information and the second light source image information into a number of areas. The difference in brightness or chroma of the same area of the two image information is compared, and after the comparison, the difference of each corresponding area of the two image information is obtained.

Step e: the fill light controller 13 determines the current position of the fill light according to the difference in brightness or chroma on the same block of the different image information; as described in the first embodiment of the fill light method, details are omitted for brevity. The difference between this embodiment and last embodiment is that in this embodiment the fill light controller 13 determines where the fill light is according to the first light source image information and the second light source image information, whereas in last embodiment the original image information and the first light source image information were used.

Step f: the fill light controller 13 calculates a dislocation result of the current position of the fill light and the optimal placement position of the fill light; as described in the first embodiment of the fill light method, details are omitted herein for brevity.

In the step f1, through the wireless communications connection, causing the fill light to issue a dislocation alert sound or a dislocation alert light associated with the dislocation result; as described in the first embodiment of the fill light method, details are omitted herein for brevity.

Step f2: The fill light controller 13 calculates the optimal image light source signal includes at least one of the light-emitting time, the light-emitting intensity, the number of light-emitting, the light-emitting spectrum and the color temperature of light-emitting of the best image light source according to the dislocation result, the difference in the brightness and chroma of the first light source image information and the second light source image information, and reference to a database, and transmit it to the fill light through the wireless communications connection; as described in the first embodiment of the fill light method, details are omitted herein for brevity.

The second embodiment is substantially the same as the first embodiment, and the main difference is that the second test is added, and the correct position of the fill light 2 is further determined by the two test flashes. When the original image information and the first light source are used, after the image comparison, the first difference after the first test flash is obtained, and the fill light controller 13 first determines the current position of the fill light 2 according to the difference after the first test flash. After the comparison between the light source image and the second light source image, the second difference after the second test flash is obtained, and the fill light controller 13 first determines the current fill light 2 according to the difference after the second test flash. As described above, the intensity, color temperature and emitting duration of the second test flash are different from those of the first test flash. When the fill light 2 is in the same position, the difference after the two test flashes should be linear, so according to the difference between the two test flashes, and reference to the database, the current position of the fill light 2 can be more accurately determined, thereby improving the calculation of the subsequent dislocation result. The above two differences will temporarily be stored in the memory unit 16 for fill light controller 13 to read for comparing the differences after two test flashes.

In the first embodiment or the second embodiment, the fill light controller 13 repeats steps b through f in a period of time to find the optimum placement position of the fill light 2.

When the photographer moves the fill light 2 according to the prompt message and places it at a position, the fill light 2 communicates with the fill light controller 13 and returns the current position, and the fill light controller 13 shows the difference between the returned position and the suggested optimal position as scores (such as 0-100 points) on the display 15. The photographer knows whether the placement is good enough according to the score, and the photographer can also share the score via a network platform.

Although the above description is only for one camera system 1 corresponding to a fill light 2, it is not limited thereto, and the camera system 1 can simultaneously establish wireless communications connections with two or more fill lights 2 (such as the first fill light, the second fill light, etc.), and sequentially calculates the optimum placement positions for each of them.

The present invention has been described in detail above, but the foregoing is only a preferred embodiment of the present invention, and is not intended to limit the scope of the invention. That is, the equivalent changes and modifications made by the scope of the present application should remain within the scope of the patent of the present invention.

What is claimed is:
1. A camera fill light method, comprises following steps:
  (a) establishing a wireless communications connection between a camera system and a fill light;
  (b) using a camera of the camera system to capture an original image information;
  (c) using the camera to send a first test light signal to the fill light to make the fill light test a first flashing, and capturing a first light source image information during the first flashing test;
  (d) using a fill light controller of the camera system to compare difference between brightness or chroma of the original image information and the first light source image information;
  (e) using the fill light controller to determine a present location of the fill light according to the difference in brightness or chroma of same blocks of different images; and
  (f) calculating a dislocation result between the present location and a best position of the fill light using the fill light controller.

2. The camera fill light method of claim 1, wherein in step, the fill light controller determines the present location of the fill light according to the difference in brightness or chroma and reference to a database.

3. The camera fill light method of claim 1, wherein step (f) comprises:

using the fill light to issue a dislocation alert sound or a dislocation alert light associated with the dislocation result via the wireless communications connection.

4. The camera fill light method of claim 3, wherein step further comprises:

using the fill light controller to calculate an optimal image light source signal includes at least one of light-emitting time, light-emitting intensity, the number of light-emitting, the light-emitting spectrum, and the color temperature of the light-emitting of an optimal image light source, according to the dislocation result and reference of a database, and to transmit the optimal image light source signal to the fill light via the wireless communications connection.

5. The camera fill light method of claim 3, wherein the step comprises:

transmitting a second test light signal to make the fill light to test a second flashing, and at least one of the intensity, the color temperature and the duration of the second test flashing is different from the first test flashing, and using the camera to capture the second light source image information during the second test flashing of the fill light;

using the fill light controller to compare the difference in brightness or chroma between the first light source image information and the second light source image information.

6. The camera fill light method of claim 5, wherein in the step (e), the fill light controller determines the present location of the fill light according to the difference in brightness or chroma and reference to a database.

7. The camera fill light method of claim 5, wherein the step (f) further comprises:

using the fill light controller to calculate the an optimal image light source signal includes at least one of light-emitting time, the light-emitting intensity, the number of light-emitting, light-emitting spectrum, and color temperature of light-emitting of an optimal image light source according to the dislocation result, the difference in brightness or chroma between the first light source image information and the second light source image information, and reference to a database, and to transmit the optimal image light source signal to the fill light via the wireless communications connection.

8. The camera fill light method of claim 1, wherein a best placement of the fill light is wherever the fill light can provide a best eye light or different facial shades in a portrait shooting that can provide a 3-dimentional appeal.

9. The camera fill light method of claim 1, wherein a best placement of the fill light is wherever the fill light can provide foreground or background fill in scenes with brighter backgrounds.

10. The camera fill light method of claim 1, wherein a best placement of the fill light is wherever the fill light can provide dark fill in scenes where a difference between light and dark is too large.

11. The camera fill light method of claim 1, wherein repeating step (b) to (f) in a period of time.

\* \* \* \* \*